United States Patent [19]
Cunningham

[11] Patent Number: 4,946,128
[45] Date of Patent: Aug. 7, 1990

[54] HOMEOSTATIC LIFTING AND SHOCK-ABSORBING SUPPORT SYSTEM

[76] Inventor: John Cunningham, 35 Loughberry Rd., Saratoga Springs, N.Y. 12866

[21] Appl. No.: 236,787

[22] Filed: Aug. 26, 1988

Related U.S. Application Data

[63] Continuation-in-part of Ser. No. 47,330, May 8, 1987, abandoned.

[51] Int. Cl.$^5$ ............................................. F16M 1/00
[52] U.S. Cl. .................................. 248/560; 248/602; 248/678; 52/167 R
[58] Field of Search ............... 248/560, 581, 602, 678, 248/571, 675, 672, 676, 562, 611, 619, 424; 14/1, 16.1; 52/167

[56] References Cited

U.S. PATENT DOCUMENTS

| | | | |
|---|---|---|---|
| 363,970 | 5/1887 | Sherwood | 14/16.1 X |
| 382,207 | 5/1988 | Barrow | 248/560 |
| 2,021,370 | 11/1935 | Mallay | 248/560 |
| 2,058,185 | 10/1936 | Simon | 248/602 |
| 3,269,069 | 8/1966 | Carlson | 52/573 X |
| 3,906,689 | 9/1975 | Nakayama | 52/167 |
| 4,004,766 | 1/1977 | Long | 248/580 X |
| 4,063,646 | 12/1977 | Stahl, Jr. | 211/70.8 X |
| 4,209,868 | 7/1980 | Tada et al. | 52/167 X |
| 4,496,130 | 1/1985 | Toyama | 52/167 X |
| 4,588,154 | 5/1986 | Basore | 211/206 X |

Primary Examiner—Karen J. Chotkowski
Attorney, Agent, or Firm—Mark I. Feldman

[57] ABSTRACT

A shock-absorbing support for a load comprises one or more spaced kinestatic members which support the load. The kinestatic members are supported at points adjacent their ends by supports which permit the kinestatic members to slide along their longitudinal axes relative to the points of support as the force on an individual kinestatic member varies, thus causing each member to assume a more or less bowed condition. With the system in a state of equilibrium, i.e., with each kinestatic member being flexed to an extent depending on its contribution to the support of the entire load, an increased load will cause an increase in the flex of each member until a new point of equilibrium is reached. If the additional load is removed, each kinestatic member will tend to straighten out, thus causing a longitudinal sliding movement through the points of support and creating friction during sliding engagement with a shock-absorbing member which absorbs the energy and prevents oscillations.

9 Claims, 3 Drawing Sheets

HOMEOSTATIC LIFTING AND SHOCK-ABSORBING SUPPORT SYSTEM

CROSS-REFERENCE TO RELATED APPLICATION

This application is a continuation-in-part of U.S. Patent Application Ser. No. 07/047,330 filed May 8, 1987, and now abandoned.

BACKGROUND OF THE INVENTION

1. Field of the Invention

The present invention relates to a homeostatic system which can be used to support, lift, and manipulate loads and more particularly to a support system which is simple in construction and which can be left unattended for long periods of time without any adverse effect on its ability to protect against unexpected, infrequent shocks.

2. Description of the Related Art

The need for support systems intended to manipulate objects of various sizes and weights, while protecting them from the effects of shock, is widespread. Some such structures, such as those for supporting piers, offshore oil drilling platforms, elevated water tanks, and the like, are designed to be essentially rigid, i.e., the structure does not yield appreciably on the application of an external force. Because of the rigid nature of the structure, when an external force is applied, there is created within the structure a variety of tensile, compressive and bending forces as a result of which at least some of the structural members must be overdesigned. Thus, for example, a member which has adequate strength in resisting purely compressive forces may have little tensile strength. If such a structure is subjected to a bending force, however, there are created within the member tensile forces which might damage or destroy it unless it is made much larger than necessary for supporting the purely compressive forces which it is intended to withstand.

Certain support structures are also subjected to forces which are applied at a more or less regular frequency, tending to create an oscillation within the support structure. If the oscillation of the structure coincides with the frequency of the applied force, the oscillation may be reinforced, thus leading to damage of the structure. Typical examples of such structures include machinery operating in a cyclic fashion, such as compressors or pile drivers, and structures resting on the sea bottom, such as piers which are subject to more or less regular wave action. In order to avoid damage to such structures, it is desirable to be able to tune the structure to a natural frequency of oscillation which differs substantially from that of the force applied. In addition, it is also desirable to provide means within the structure for absorbing and dissipating the externally applied energy, thereby inhibiting the development of such undesirable oscillations.

SUMMARY OF THE INVENTION

In accordance with the invention, there is provided a support structure wherein the shock and energy-absorbing functions are provided by elongated elastic members when a load is applied intermediate the end positions, as a result of which the members bend to assume an arcuate shape in proportion to the magnitude of the applied load. The structure of the invention is designed in accordance with the expected loads, and no excess load capacity must be applied. A system incorporating a plurality of such members in accordance with the invention can be used for lifting and manipulating relatively large loads with the application of only relatively small forces. In addition, the system can be used to provide a shock-absorbing function to the load.

The system is referred to herein as a "homeostatic" system. "Homeostasis" is defined as "a relatively stable state of equilibrium or a tendency toward such a state between the different but interdependent elements or groups of elements of an organism or group" (Webster's New Collegiate Dictionary, G & C Merriam Co., 1976). In addition, an elongated structural member being used in the system and having the ability to return to its original state after a stressing force has been removed is referred to herein as a "kinestatic" member.

In addition to being useful in applications in which repeated shocks are anticipated, e.g., in pile drivers, the assembly of the invention can be used to advantage when shocks are not expected, but are possible over long periods of time, e.g., shocks caused by earthquakes. The system of the invention can be used to support buildings, bridges, and similar structures while providing protection against the possibility of damage from earthquakes as a result of the inherent shock-absorbing capacity of the supporting structure.

Briefly described, the supporting system of the invention comprises a plurality of spaced, generally parallel kinestatic members which support a load. The kinestatic members are supported solely at points adjacent their ends by means which permit the kinestatic members to slide in channels, grooves or sleeves relative to the points of support as the force on an individual kinestatic member varies, causing the member to assume a more or less bowed condition. These channels, grooves or sleeves are made of friction-producing materials which absorb energy as the kinestatic member bends and slides through them. With the system in a state of equilibrium, i.e., with each of the kinestatic members being flexed to an extent depending on its contribution to the support of the entire load, an increased load will cause an increase in the flex of each member until a new point of equilibrium is reached. If the additional load is now removed, each of the kinestatic members will tend to straighten out, causing a sliding movement through the channels, grooves or sleeves and creating friction due to the friction-producing materials used therein during sliding engagement with a shock-absorbing member which absorbs the energy and prevents oscillations of the structure being supported.

BRIEF DESCRIPTION OF THE DRAWINGS

The invention will be better understood from the detailed description which follows taken in conjunction with the accompanying drawings.

DETAILED DESCRIPTION OF THE PREFERRED EMBODIMENTS

Figure 1:
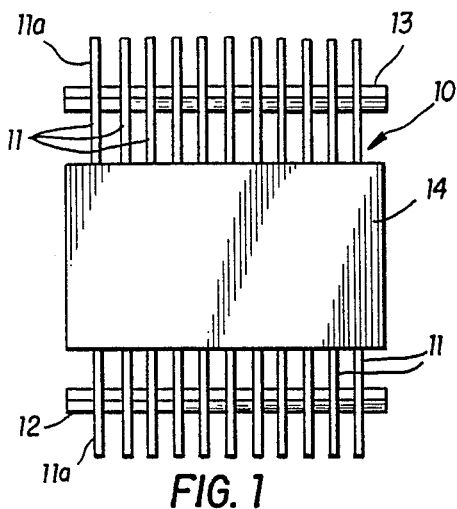
FIG. 1 is a top plan view of a schematic representation of a system of the invention showing a plurality of kinestatic members supporting a load.
Figure 2:
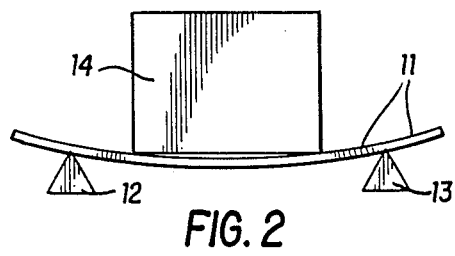
FIG. 2 is a front elevational view of the system of FIG. 1.

As shown in FIGS. 1 and 2, in a schematic representation of the system 10 of the invention, a plurality of kinestatic members 11 is arranged in equispaced and generally parallel fashion, laying across at least two fixed bearing supports 12 and 13 with a load 14 resting on a midportion of the kinestatic members 11 extending intermediate the fixed bearing supports 12 and 13. Kinestatic members 11 are elongated, elastic members which, when solely supported by the fixed bearing supports 12 and 13 at a distance from longitudinally unrestrained ends 11a, will deflect in response to a transverse force or load 14 applied between the bearing supports 12 and 13 to assume an arcuate or bowed shape, the amount of flex being dependent on the magnitude of the applied force within the load-bearing capacity of the member 11. For use with any particular load 14, a sufficient number of kinestatic members 11 should be used so that none of them is stressed beyond its elastic limit, and also so that each member 11 will tend to return to its straight, unstressed condition when the load 14 applied thereto is removed. In the embodiment shown in FIGS. 1 and 2, there is no mechanical connection between the individual kinestatic members 11. Accordingly, each member 11 will deflect in accordance with the amount of the load 14 which it is carrying. In a state of equilibrium, the sum of the loads supported by the individual kinestatic members 11 will equal the applied force, e.g., the weight of load 14.

Figure 1A:
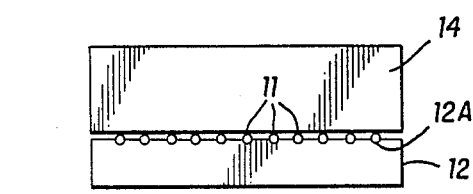
FIG. 1A is a side elevational view of the system of FIG. 1.
Figure 3:
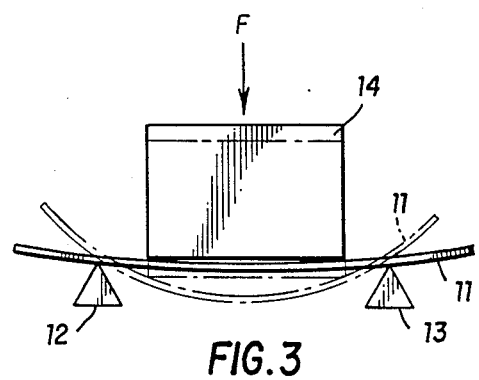
FIG. 3 is a representation similar to that of FIG. 2 showing the effect on the system due to fluctuations in the load.

If an additional load, represented by force F, is applied to load 14, as shown in FIG. 3, load 14 will move downwardly to the position shown in the dotted lines wherein the kinestatic members 11 have assumed a more arcuate shape to counteract the additional force F which has been exerted. In assuming the more arcuate shape, it will be seen that the length of each kinestatic member 11 between the bearing supports 12 and 13 has increased beyond any dimension caused solely by heat-induced expansion and contraction. As shown in FIG. 1A, such increase involves a sliding movement with frictional engagement of the kinestatic members 11, for example, in open channels 12A of the bearing support 12. Similarly, the members 11 slide longitudinally in open channels (not shown) in the bearing support 13. Such open channels 12A may be in the nature of grooves or notches formed along a top portion of the fixed bearing suppports 12 and 13.

Figure 5:
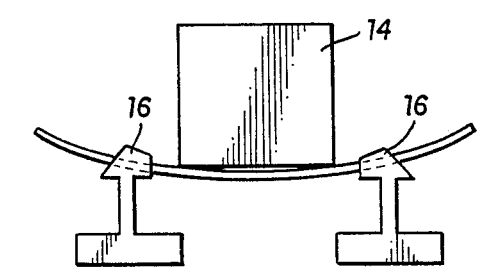
FIG. 5 is a representation similar to that of FIG. 2 in which the kinestatic members slide through shock-absorbing elements rather than slide in open channels or grooves.

If the additional force F in FIG. 3 is removed, the tendency of the kinestatic members 11 is to return to their original positions. The energy which had been stored in the kinestatic members 11, as a result of their greater deflection, is expended in moving to the load 14 upwardly and, in a friction-free environment, would tend to produce oscillations of the load 14. To a certain extent, the released energy of the system is absorbed and dissipated by the frictional contact between kinestatic members 11 and bearing points 12 and 13. In order to maximize the energy-absorbing and damping effect, it may be desirable to provide shock absorbers 16 at each of the bearing points as shown in FIG. 5. The shock absorbers 16 can be of any conventional form and function by converting the released energy to heat as a result of friction, compression of a trapped fluid, or any other conventional manner.

Figure 4:
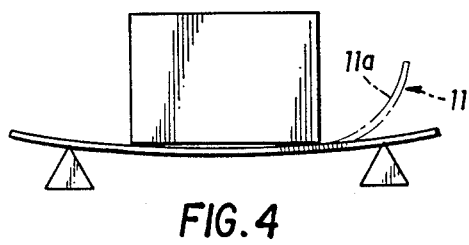
FIG. 4 is a representation similar to FIG. 2 showing an end of one of the kinestatic members displaced upwardly.

Each of the kinestatic members 11 supporting load 14 can be manipulated individually by applying a force which is only a small fraction of the total weight of the load 14. At equilibrium, the force supported by each kinestatic member 11 is generally inversely proportional to the number of kinestatic members 11 over which the load 14 is spread. If a sufficiently large number of kinestatic members 11 is used, the load on any individual member 11 will be relatively small. Accordingly, the end of a single kinestatic member 11a can be lifted to the position shown in FIG. 4 without applying an inordinately large force. The effect of lifting the end 11a of a single kinestatic member 11 is to cause that member 11 to apply a larger upward force on the load 14, and a consequent reduction in the force applied by all other kinestatic members 11. By placing a block (not shown) under the end 11a of the kinestatic member 11 so that the member 11 is maintained in its elevated position shown in FIG. 4, and by lifting individually the ends 11a of the other kinestatic members 11 in turn and also blocking them up to their elevated positions, the ultimate net effect is to lift the entire load 14 by applying in turn a force which is only a small fraction of the total thereof. Since the kinestatic members 11 are free to bend in all directions, the ends 11a thereof can also be moved laterally along the bearing supports 12 and 13 in the same manner, thus causing the load 14 to move laterally as desired, again without requiring the application of unduly large forces.

In order to act effectively as an efficient shock absorber, the system of the invention must dissipate the absorbed energy by means of friction between the kinestatic members 11 and the bearing supports 12 and 13. Accordingly, when used in applications involving repeated and continuous shocks, it will be desirable to use shock absorbers 16 in connection with the bearing supports, as illustrated in FIGS. 10 and 11.

Figure 10:
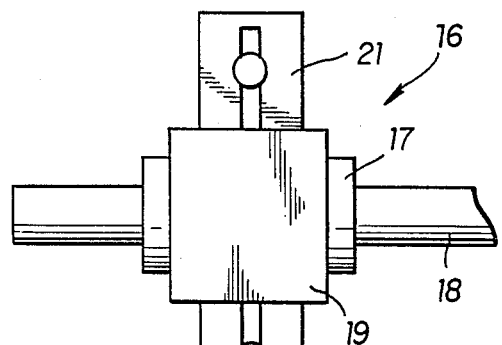
FIG. 10 is a top plan view of an adjustable friction-producing, shock-absorbing sleeve which can be used at a bearing mount of the system.
Figure 11:
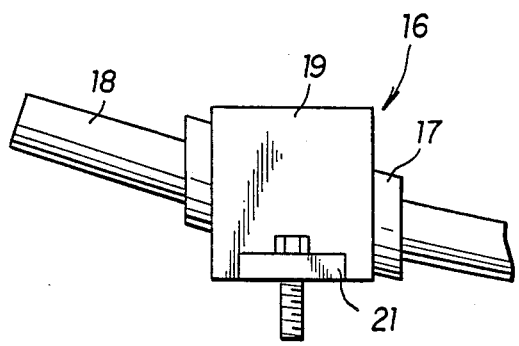
FIG. 11 is a side elevational view of the mount of FIG. 10.

FIG. 10 is a top view of an adjustable bearing support used to attach kinestatic members 18 thereto while FIG. 11 is a side view of such a support. The top portion of the bearing support includes an elongated sleeve 17 of a relatively high friction material surrounding the kinestatic member 18. The sleeve 17 increases the energy-dissipating effect of the sliding movement of the kinestatic member 18. Sleeve 17 also functions as a shock absorber and is held in an appropriate holder 19 which permits periodic replacement when the sleeve 17 is worn. Holder 19 is held in position by means of adjustable slotted tabs 21 which permit longitudinal movement of the bearing suppport to be made when necessary.

While the kinestatic members 18 used in the invention can be continuous members of uniform construction throughout, such as solid rods, hollow tubes, etc., it is also within the scope of the invention to provide a composite kinestatic member wherein the deformable elements are attached to either end of a central portion which is not in itself appreciably flexible.

Figure 6:
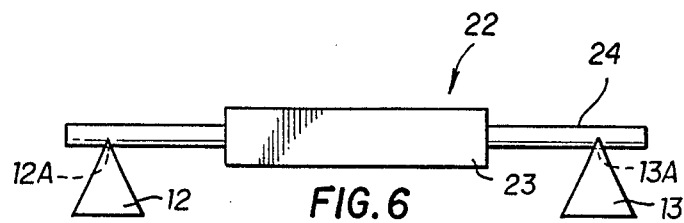
FIGS. 6, 7, and 8 snow alternative constructions of kinestatic members which can be used.

As illustrated in FIG. 6, a composite kinestatic member 22 can include a central rigid platform 23 to the opposite ends of which are attached in any appropriate manner a flexible kinestatic rods 24. This construction provides a central flat platform 23 on which a load can rest. FIG. 6 the composite kinestatic member 22 in an unstressed condition, i.e., with no load applied, resting in open channels 12A and 13A formed in the top portion of each of the two fixed bearing supports 12 and 13, respectively.

Figure 7:
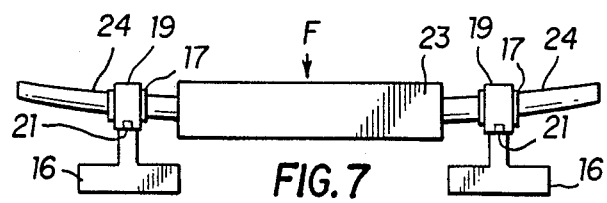

FIG. 7 depicts the same kinestatic rod 24 as it would appear when loaded, showing that the central portion 23 maintains a flat surface. Other composite constructions can be used to achieve any desired form when loaded, e.g., a rod-like member 24 which is convex when unloaded and becomes flat when loaded, and the like. The two bearing supports 16 each have adjustable slotted tabs 21 for retaining the holders 19 for the elongated shock-absorbing sleeves 17 that slidably and frictionally engage and support the kinestatic rods 24.

Figure 8:
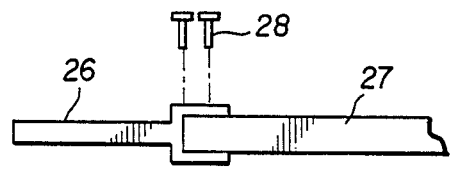

FIG. 8 shows an alternative means for forming a composite kinestatic member in which a flexible end portion 26 has a C-shaped clamping fastener is joined to a central rigid portion 27 by means of pins 28 or the like.

Figure 9:
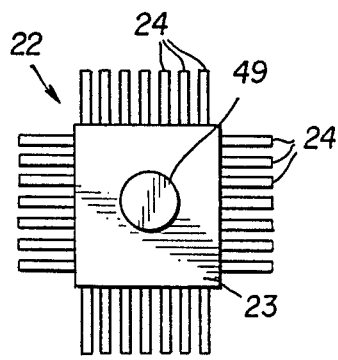
FIG. 9 is a top plan view of a load supported by kinestatic members on for sides.

FIG. 9 is a top plan view of another alternate embodiment on which a cylindrical load 49 is supported by a plurality of kinestatic rods 24 on all four sides of the central flat platform portion 23 of the composite member 22.

Figure 12:
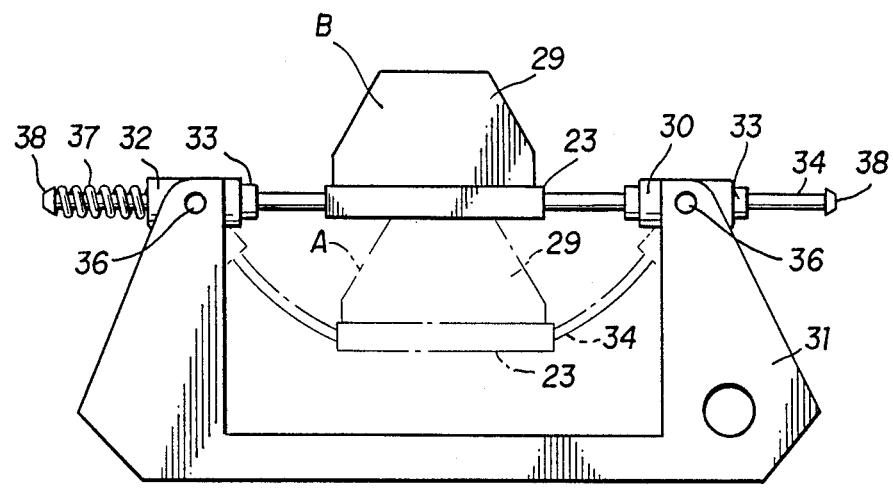
FIG. 12 is a side elevational view of an embodiment of the invention provided with shock-absorbing bearing points, a spring for increasing the load capacity, and end stops on the kinestatic members.

FIG. 12 shows a typical homeostatic system of the invention used for supporting a load 29 resting on the rigid central flat platform 23 which is subject to repeated shocks. The device comprises a frame 31 supporting two elongated bearing sleeves 30 and 32, each including a shock absorber 33 through which a kinestatic member 34 slides longitudinally. Shock absorber 33 is journaled in the fixed bearing support about pins 36 which permit rotation of both sleeves 30, 32 and the shock absorber 33 therein. For purposes of illustration, the left end portion of the kinestatic member 34 which slides longitudinally in each shock absorber 33 is provided with an assisting spring 37 held between the bearing sleeve 32 and an end stop 38 which limits the possible longitudinal sliding movement of the kinestatic member 34 through each shock absorber 33.

The device of FIG. 12 is shown in two positions, A and B. In position A, the kinestatic member 34 has flexed to an equilibrium condition, wherein the load 29 resting on the platform 23 is supported by the restoring force exerted by the kinestatic member 34 aided by the assisting spring 37. If a sudden upward shock force is transmitted to the load 29, condition B is achieved, wherein, the kinestatic member 34 is straight and essentially horizontal with the platform 23. In passing from condition A to condition B, the energy released in the straightening of the member 34 is dissipated by the shock absorber 33.

Figure 14:
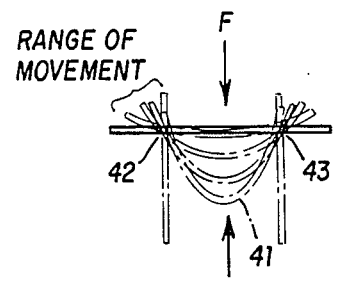
FIG. 14 illustrates the variation in the homeostatic angle as the load supported by the system varies.
Figure 13:
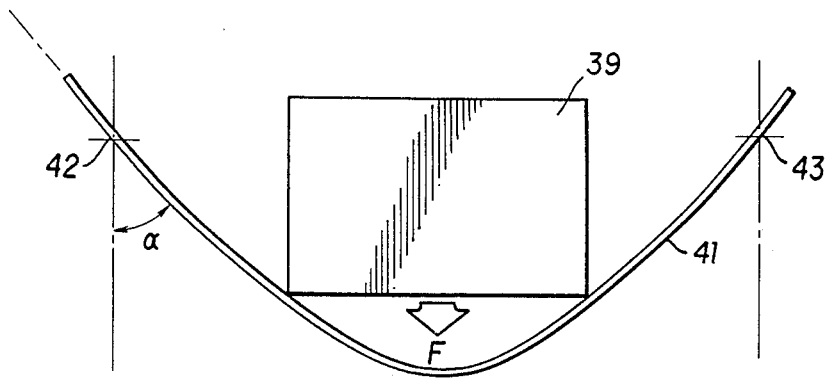
FIG. 13 is a schematic representation illustrating the homeostatic angle which exists between a kinestatic member and a bearing support.

FIGS. 13 and 14 illustrate some of the principles of operation of the device of the invention. As shown in FIG. 13, load 39 causes a kinestatic member 41 which is supporting it to bear on supports 42 and 43 near either end thereof at a critical homeostatic angle which in any given installation varies with the extent of the load 39. As shown in FIG. 14, if the downward force F is insufficient to cause any substantial flexing of the kinestatic member 41, the force exerted on each of the bearing points 42 and 43 is exerted along an imaginary vertical line parallel to the direction of the applied force F. As the applied force F increases, causing the kinestatic member 41 to flex in an increasing amount as shown, the force applied to the bearing points 42 and 43 changes from a vertical to an increasingly horizontally oriented, outwardly directed force.

Depending on the extent to which the kinestatic member 41 is deflected, removal of the applied force F will cause the kinestatic member 41 to tend to assume an unstressed condition wherein it is straight. When only a slight bending of the kinestatic member 41 has occurred, the straight equilibrium condition can be achieved with a minimum of friction between the member 41 and the bearing points 42 and 43, so that in this instance the kinestatic member 41 acts as a spring which reacts quickly when the applied force F is removed. With increasing amounts of initial deflection, however, the outwardly directed force between the deflected kinestatic member 41 and the bearing points 42 and 43 becomes greater. Consequently, the friction which is created tends to inhibit the speed with which the kinestatic member 41 can reachieve the straight equilibrium condition after the applied force F is removed. Beyond a limiting amount of flex of the kinestatic member 41, the outwardly directed force against the bearing points 42 and 43 is so great that even after the force F is removed, the attendant friction prevents the stressed kinestatic member 41 from returning to its straight equilibrium position.

Figure 15:
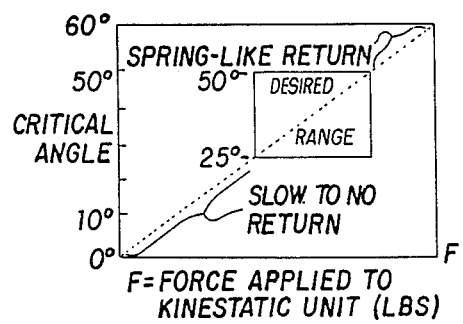
FIG. 15 is a graph illustrating the typical operating ranges for the homeostatic angle.

By reference to FIGS. 13 and 14, it will be seen that when the critical homeostatic angle approaches 90 degrees, i.e., when little or no load is supported by the kinestatic member 41, the friction produced between the kinestatic member 41 and the bearing points 42 and 43 is very low and consequently the energy-absorbing and dissipating capacity is also low. In this condition, the kinestatic member 41 acts like a spring and is an inefficient shock dissipater. As the homeostatic angle decreases towards zero, the amount of shock-absorbing capacity resulting from the friction between the kinestatic member 41 and the bearing points 42 and 43 increases. However, when the homeostatic angle approaches zero, the self-restoring force disappears and, accordingly, the shock-absorbing function also disappears. For purposes of the invention, it has been found, as shown in FIG. 15, that a homeostatic angle within the range of 25 to 50 degrees provides an efficient shock-absorbing and energy-dissipating function.

The foregoing detailed description has been given for clearness of understanding only and the various embodiments should be understood therefrom as modifications which will readily occur to those skilled in the art.

What I claim as my invention is:

1. A shock-absorbing support structure for a load, comprising:
   at least two fixed bearing supports, each having a top portion;
   at least two load-bearing elongated kinestatic members having longitudinally sliding ends and also having midportions extending between the two fixed bearing supports, said kinestatic members being capable of bending from an original straight shape to assume an arcuate or bowed shape when the load is applied to the midportions of the kinestatic members intermediate the two fixed bearing supports and each kinestatic member returning to the original straight shape when the load is removed; and
   open channel means, formed along the top portion of each of the two fixed bearing supports, for slidably and frictionally engaging said supporting the kinestatic members at a distance spaced from said longitudinally sliding ends so that the longitudinally sliding ends move relative to the fixed bearing supports as a result of the bending of the kinestatic members when the load is applied to the midportions of the kinestatic members intermediate the bearing supports;
   wherein each of the kinestatic members is a composite including a rigidly flat central platform on which the load can rest, said platform having opposite end portions, with at least one flexible rod attached thereto.

2. The support structure in accordance with claim 1 wherein the kinestatic members are equispaced and arranged parallel to each other across the two fixed bearing supports.

3. The support structure in accordance with claim 1 wherein the open channel means are provided with shock absorbers.

4. A shock-absorbing support structure for a load comprising:
   at least two bearing supports, each having a top portion; at least two load-bearing elongated kinestatic members having longitudinally sliding ends and also having midportions extending between the two bearing supports, said kinestatic members being capable of bending from an original straight shape to assume an arcuate or bowed shape when the load is applied to the midportions of the kinestatic members intermediate the two bearing supports and each kinestatic member returning to the original straight shape when the load is removed;
   elongated shock-absorbing sleeve means, formed of a relatively high friction material, for slidably and frictionally engaging the supporting the kinestatic members at a distance spaced from the longitudinally sliding ends so that said ends move relative to the bearing supports as a result of the bending of the kinestatic members when the load is applied to the midportion of the kinestatic members intermediate the bearing supports;
   means for holding the elongated shock-absorbing sleeve means in position on the top portions of the bearing supports; and
   adjustable slotted tab means for retaining the holding means in position on the bearing supports;
   wherein each of the kinestatic members is a composite including a rigidly flat central platform on which the load can rest, said platform having opposite end portions with at least one flexible rod attached thereto.

5. A shock-absorbing support structure for a load, comprising:
   at least two fixed bearing supports;
   at least two load-bearing elongated kinestatic members having end stops and also having midportions extending between the two fixed bearing supports, said kinestatic members being capable of bending from an original straight shape to assume an arcuate or bowed shape when the load is applied to the midportions of the kinestatic members intermediate the two fixed bearing supports and each kinestatic member returning to the original straight shape when the load is removed;
   elongated sleeve means for slidably engaging and supporting the kinestatic members at a distance spaced from their end stops;
   shock-absorbing means, arranged in the elongated sleeve means, for frictionally engaging the kinestatic members so that movement of the end stops is limited longitudinally to the fixed bearing supports; and
   first pin means, journalled in the fixed bearing supports, for permitting rotation of the both the elongated sleeve means and the shock-absorbing means, said rotation occurring as a result of the bending of the kinestatic members when the load is applied to the midportion of the kinestatic members intermediate the fixed bearing supports;
   wherein each of the kinestatic members is a composite including a rigidly flat central platform on which the load can rest, said platform having opposite end portions with at least one flexible rod attached thereto.

6. The support structure in accordance with claim 5, further comprising:
   spring means, engaged around each of the kinestatic members between the elongated sleeve means an the end stops, for restraining the end stops from sliding through the shock-absorbing means.

7. The support structure in accordance with claim 5, further comprising:
   second pin means for joining each of the flexible rods to each of the opposite end portions of the platform.

8. The support structure in accordance with claim 4, further comprising:
   pin means for joining each of the flexible rods to each of the opposite end portions of the platform.

9. The support structure in accordance with claim 1, further comprising;
   pin means for joining each of the flexible rods to each of the opposite end portions of the platform.

* * * * *